Dec. 27, 1932.  W. C. HAYMAN ET AL  1,892,551
END CAP OR HEAD FOR ELECTRIC CABLES
Filed Nov. 22, 1929
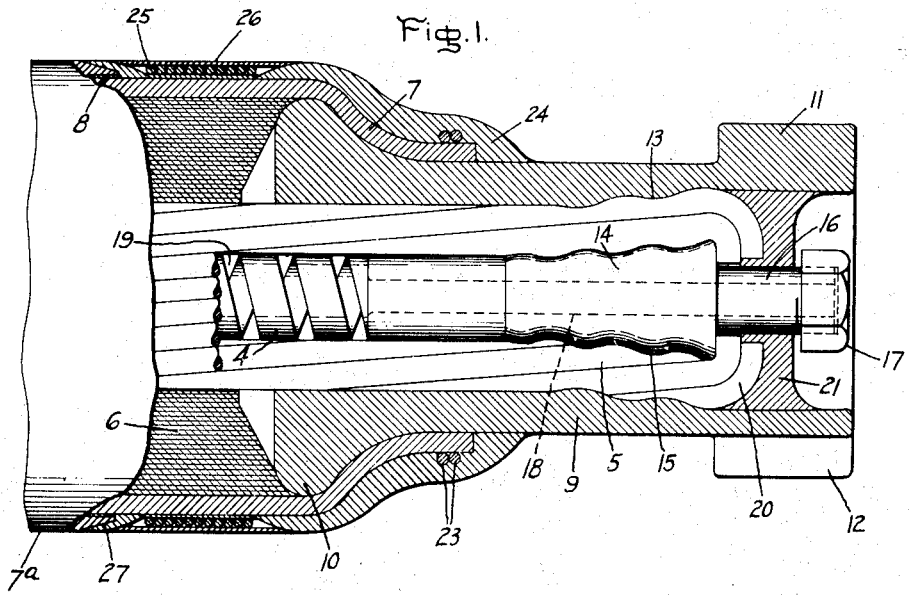
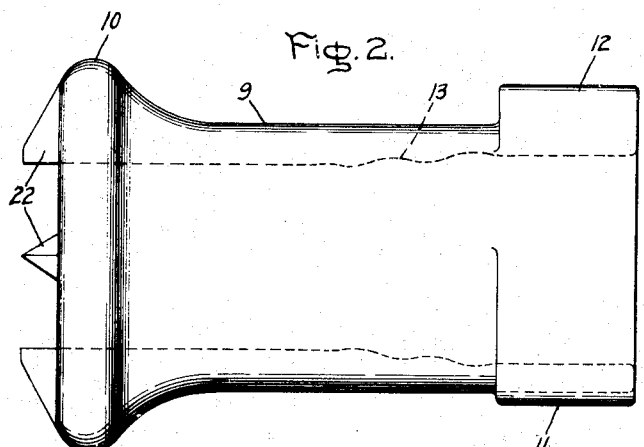
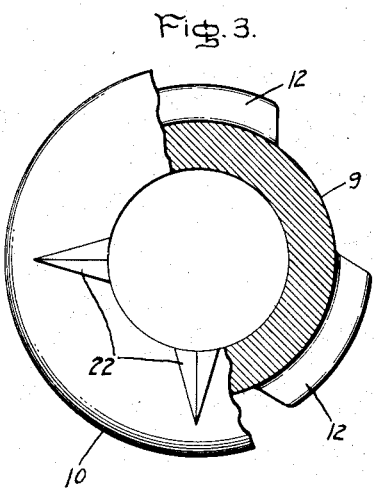
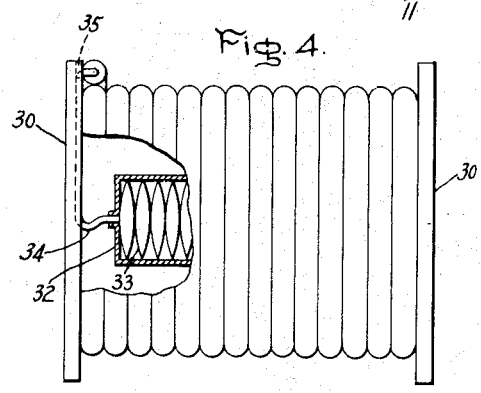
Inventors:
William C. Hayman,
Carl A. Piercy,
by Charles E. Tullar
Their Attorney.

Patented Dec. 27, 1932

1,892,551

UNITED STATES PATENT OFFICE

WILLIAM C. HAYMAN, OF SCHENECTADY, AND CARL A. PIERCY, OF BALLSTON LAKE, NEW YORK, ASSIGNORS TO GENERAL ELECTRIC COMPANY, A CORPORATION OF NEW YORK

END CAP OR HEAD FOR ELECTRIC CABLES

Application filed November 22, 1929. Serial No. 409,111.

The present invention relates to pulling heads or end caps for electric cables which are filled with fluid insulation, such as oil for example, at a pressure somewhat above that of the atmosphere.

Cables of this character are of necessity made in sections or lengths for convenience of manufacture and installation and are drawn into conduits or ducts located beneath the surface of the earth through manholes, after which the sections are jointed. The weight of a cable section is considerable, depending upon the length and diameter. In practice the sections vary in length depending upon conditions at the place of installation, sections of the order of 600 feet being common. The diameter varies with different types of cable, those for high voltages being of the order of three to three and one-half inches. Taking the large cable, the total weight of a 600 foot length, three and one-half inches in diameter, when filled with fluid insulation would be approximately 7,700 pounds. Such cable is stiff and hard to bend as it must be to be fed through a manhole into a conduit duct. It is customary to coat the lead covering of the cable with lubricant and especially where it enters the duct. In spite of everything that can be done the strains on the cable during the pulling operation are very heavy and therefore require a very strong connection between the cable and the pulling agent. The pull exerted on one end of a cable section to draw it into a duct may vary from a minimum of 2,000 pounds at the start to a maximum of 8,000 pounds. The difficulty of making a suitable pulling head is further enhanced by the fact that its diameter must be less than that of the conduit duct and is preferably not greater than that of the cable itself so as to receive the part or device attached to the pulling agent, which of course must be of less diameter than said duct. In the case of fluid filled cables, it is also important to provide means whereby the cable may be evacuated after the head is mounted in place, and to provide a means whereby a temporary reservoir may be connected thereto so that fluid may be introduced into the cable when necessary or received therefrom.

Our invention has for one of its objects the provision of a pulling head or cap of improved construction which will fulfill the exacting requirements above specified and one which is reasonable in cost considering the work which it has to perform.

A further object of our invention is the provision of an end head or cap for high tension cables by means of which a cable section or length may be evacuated and fluid filled, and by means of which a temporary reservoir may be connected to the fluid containing channel in the reservoir to maintain a suitable pressure therein and prevent the formation of destructive voids within the cable itself.

For a consideration of what we believe to be novel and our invention, attention is directed to the accompanying description and the claims appended thereto.

In the accompanying drawing which is illustrative of our invention, Fig. 1 is a sectional view of one end of a cable length to which is secured our improved pulling head; Fig. 2 is a side view of the bushing; Fig. 3 is an end view thereof, partly in section, and Fig. 4 is a view, partly in section, of a cable reel.

4 indicates the core of the cable which comprises a flat strip of metal which is helically wound after the fashion of a coiled spring, inside of which is a channel for insulating fluid, such as thin oil. Mounted on this as a support are the conductors 5 which in turn are covered with numerous layers of paper or other insulation 6, the latter being usually in the form of tightly wound narrow strips. The paper is impregnated with fluid, such as thin oil contained in the central channel. Outside of the paper is an impervious lead sheath 7. In some cases as in the present instance, the lead sheath is wound with a thin metal tape 8 to increase the strength and surrounding it is a second or outer lead sheath 7a.

9 indicates a metal bushing which has a well rounded cylindrical enlargement 10 at its inner end, and a second enlargement 11 at its outer end. The enlargement 11 instead of being cylindrical has three segmental members 12 of substantial cross-section spaced 120° apart and arranged to receive and to cooperate with the head or other device of the pulling agent. The bore of the bushing is made slightly conical with the portion of smaller diameter located at the inner end. That portion of the bore nearer the outer end is corrugated, that is to say, is provided with projections 13 in planes perpendicular to the axis of the bushing and between which are shallow recesses, the object of the arrangement being to improve the holding between the conductors and the bushing.

Inserted within the ends of the conductors 5 which are slightly splayed thereby is a plug 14, the inner end of which is cylindrical and the outer end conical as well as corrugated, as at 15, the corrugations extending perpendicular to the axis of the plug. The plug has a tubular extension 16 of somewhat smaller diameter which is screw threaded at its outer end to receive a closing cap 17 and its gasket, or it may be connected by a flexible pipe or tube to a reservoir. The plug has a central passage or channel 18 which is in direct communication with the central channel 19 in the cable which latter is defined by the coiled support 4. By means of the plug the cable can be evacuated by a vacuum pump and subsequently filled with degasified oil, or a fluid containing reservoir may be attached to a cable length to ensure the proper fluid pressure within the cable from the time it leaves the factory to the place of installation, said pressure being somewhat above that of the atmosphere. It also permits of re-evacuating the cable after being drawn into a duct, or the addition of fluid, if that be necessary.

The bushing is first mounted in the position shown and it may then or later be fastened in place as will be described later. The plug is then forced into place and the conical end thereof forces the conductors outwardly into firm engagement with the inner wall or bore of the bushing. The ends of the conductors or strands 5 which previous to assembling the parts have been cut to the desired lengths are then bent over the shouldered outer end of the plug as indicated at 20. After this the end of the cable length is moved to an upright position and well heated after which hot solder is poured into the end which fills the spaces between the conductors and also unites them with the plug and bushing. Enough solder is used to form a complete wall or closure 21 at the cable end and thus prevent the escape of fluid from the cable through any minute spaces which otherwise may not be completely filled with solder or the entrance of air, other gases or foreign matter of any character.

The bushing has a flat inner end which is provided with sharp V-shaped projections 22 which are forced into the paper or other insulation to assist in preventing relative turning of the cable and head during the pulling operation. The insulation makes a snug fit with the end of the bushing, and of course with the projections. The inner sheath is pounded down until it makes a snug fit or is shaped about the enlargement 10, after which the end is wrapped with a binding band of stout wire 23 to prevent it from spreading when the cable is being pulled into place. The end is then carefully connected to the bushing by a wiped soldered joint 24. The inner sheath is also wound with a second binding band of stout wire 25 over which is wound metal tape 26 which wire and band are soldered in place. The end of the outer sheath is tapered at 27 and then all of the intervening spaces about the sheaths and binding wires are filled with solder and made as smooth as possible by scraping or filing. The point is to make the end of the cable entering the conduit duct as smooth as possible and free of all projections which would tend to retard the pulling operation. The parts having been thus prepared are ready to receive the device or part (not shown) which is attached to a steel cable or equivalent means used in pulling the electric cable into place.

After the cable is installed, the pulling head is removed as by sawing the cable near the inner end of the joint, and the ends of adjacent sections or lengths are then united in any suitable manner.

By making the plug 14 with an internal passage or channel 18 and providing it with a part 16 which is accessible from the outside of the joint, the cable may readily be treated, that is, evacuated to remove air, other gases and moisture and subsequently filled with degasified oil. By extending the plug well into the strands of the conductor and into direct communication with the central channel 19 a free passage for the oil is provided both for treating and later when the plug is connected at its outer end with a variable capacity reservoir containing suitable compressible cellular elements.

In Fig. 4 is shown a reel comprising end heads 30 and a hollow barrel upon which the cable is wound or reeled. Inside of the barrel is located a sealed container 32 in which are individual sealed cellular elements 33. To a convenient place in the container is connected a flexible tube or conduit 34, the other end of which is connected to the part 16 of the center plug by a suitable union. For this purpose a lead pipe is satisfactory as it can readily be bent to any desired shape. The tube should be protected from injury during shipment and subsequent handling, as for example by locating it in a recess 35 formed in one of the heads.

One or both of the cable ends may be provided with heads or caps of the character described. If a reservoir is connected to the pulling head it will be removed before the pulling operation and the end of the part 16 closed by the cap 17. As the period of time required to draw a section into a duct is not great and the temperature during that period will not greatly vary the presence of a connected temporary reservoir is not always necessary. If it is so considered the far end of the cable may be provided with such a reservoir, particularly if the jointers are not ready to make the joints or splices.

Our improved construction as will be seen comprises a combined pulling head or cap and a means whereby the cable can be treated in the factory as by evacuating and filling with degasified oil, and which permits of the use of a temporary reservoir from the time the cable is manufactured until it is installed. By using two heads, one at each end of the section, the cable may be treated from both ends. This also permits of applying a vacuum pump at one end and admitting degasified oil at the other. Should only one temporary reservoir be provided and that at the pulling end of the cable it may be reconnected after the pulling operation, in which case it will be effective in forcing oil into the cable to make up for any loss at the other end during the jointing operation.

What we claim as new and desire to secure by Letters Patent of the United States is:

1. A pulling head for an electric cable having an insulated, stranded conductor containing a fluid receiving channel, and an enclosing sheath, which comprises a tubular bushing into which the strands extend, a portion of the inner wall of the bushing being conical, an enlargement at the inner end of the bushing of less diameter than the sheath which is covered by and is secured to the sheath, a means integral with the outer end of the bushing also of less diameter than the sheath which is adapted to receive a pulling device, and a tapered plug which is located within the channel of the cable and forces the strands outwardly into engagement with the conical wall of the bushing, said plug having a shoulder at one end over which the ends of the strands are bent.

2. A pulling head for an electric cable having an insulated stranded conductor, and an enclosing sheath, which comprises a tubular bushing into which the strands extend, a portion of the inner wall of the bushing being conical, a rounded enlargement at the inner end of the bushing of less diameter than the sheath which is covered by an end of the sheath, a band which binds the end of the sheath on the bushing, a means integral with the bushing which is adapted to receive a pulling device, a tapered plug which is located within the channel of the cable and forces the strands outwardly into engagement with the conical wall of the bushing and has a shoulder over which the ends of the strands are bent, and a body of easily fusible metal which covers the end of the sheath and unites it with the bushing.

3. A pulling head for an electric cable having an insulated stranded conductor and an enclosing sheath, which comprises a tubular bushing into which the strands extend, an enlargement at the inner end of the bushing over which an end of the sheath is shaped, a second enlargement at the outer end of the bushing having segmental projections to receive a pulling device, a band at the end of the sheath for binding it on the bushing, a second band for binding the sheath on the insulation adjacent the bushing, a body of easily fusible metal which unites the sheath end and the bushing, and a plug which is located within the channel of the cable and forces the strands outwardly into engagement with the inner wall of the bushing and has a shoulder over which the ends of the strands are bent.

4. A pulling head for an electric cable having an insulated stranded conductor, a fluid containing channel and an enclosing sheath, which comprises a tubular bushing into which the strands extend, a central plug for forcing the strands outwardly into engagement with the inner wall of the bushing, means for holding the plug in place and securing the strands, and a channel which extends through the plug and registers with the channel in the cable whereby the cable may be treated after the head is mounted in place.

5. A pulling head for an electric cable having an insulated stranded conductor, a fluid containing channel and an enclosing sheath, which comprises a tubular bushing into which the strands extend, an enlargement at the inner end of the bushing over which the end of the sheath is shaped, a second enlargement at the outer end thereof adapted to receive a pulling device, a plug for forcing the strands against the inner wall of the bushing, a passage within the plug which communicates at its inner end with the channel in the cable and extends to the outside of the head, a closing means for the outer end of the passage, and means for uniting the strands with the bushing and plug.

6. A pulling head for an electric cable having an insulated stranded conductor, a fluid containing channel and an enclosing sheath, which comprises a tubular bushing into which the strands extend, an enlargement at the inner end of the bushing over which the end of the sheath is shaped, a means for securing the sheath to the bushing, a second enlargement at the outer end of the bushing adapted to receive a pulling device, a conical plug having a fluid passage therein which communicates with the channel in the cable, said plug forcing the strands against the inner wall of the bushing, a closing means for the outer end of the passage, a body of solder which fills the spaces between the strands and the bushing and plug, bands on opposite sides of the inner enlargement on the bushing for binding the sheath in place, and a body of solder which unites the end of the sheath with the bushing and covers one of the binding bands.

7. A pulling head for an electric cable having an insulated stranded conductor, a fluid containing channel and an enclosing sheath, which comprises a tubular bushing into which the strands extend, an enlargement at the inner end of the bushing over which the end of the sheath is shaped, means for fastening the sheath to the bushing, sharpened projections on the end face of the bushing which enter the insulation to prevent relative turning of the parts, a means attached to the bushing which is adapted to receive a pulling device, a plug having a fluid passage located within the bushing which plug forces the strands into engagement with the inner wall of the bushing, a closing means for the outer end of the passage, and means for uniting the strands with the bushing and plug which also prevents the escape of fluid from the channel through the insulation and between the strands of the conductor.

8. An end closing head for an electric cable having an insulated conductor, a fluid containing channel and an impervious sheath, which comprises a tubular member, the interior of which communicates with the channel at one end and is arranged to be connected to a source of fluid supply at the other, a metallic bushing which encloses the member and also the conductor and has an enlarged head presenting an end face to and contacting with the insulation on the conductor, said bushing being of less diameter than and being partly enclosed by the end of said sheath, and means for uniting the sheath and bushing which also forms a fluid tight seal.

9. An electric cable having an insulated stranded conductor, a fluid containing channel and an enclosing sheath in combination with a pulling member, means for fastening the member to the conductor, means for sealing the end of the cable against the escape of fluid and the admission of air and other gases, a conduit which communicates with the channel within the cable and extends outwardly through the sealing means, and a means for closing the outer end of the conduit.

In witness whereof, we have hereunto set our hands this 21st day of November, 1929.

WILLIAM C. HAYMAN.
CARL A. PIERCY.